United States Patent [19]

Egner-Walter et al.

[11] Patent Number: 4,979,259
[45] Date of Patent: Dec. 25, 1990

[54] WINDSHIELD WIPER SYSTEM ESPECIALLY FOR MOTOR VEHICLES

[75] Inventors: Bruno Egner-Walter, Heilbronn; Eckhardt Schmid, Brackenheim; Wolfgang Scholl, Gemmrigheim, all of Fed. Rep. of Germany

[73] Assignee: SWF Auto-Electric GmbH, Bietigheim-Bissingen, Fed. Rep. of Germany

[21] Appl. No.: 364,597
[22] PCT Filed: Jul. 18, 1987
[86] PCT No.: PCT/EP87/00393
§ 371 Date: Apr. 20, 1988
§ 102(e) Date: Apr. 20, 1988
[87] PCT Pub. No.: WO88/00541
PCT Pub. Date: Jan. 28, 1988

Related U.S. Application Data

[63] Continuation of Ser. No. 223,201, Apr. 20, 1988, abandoned.

[30] Foreign Application Priority Data

Jul. 22, 1986 [DE] Fed. Rep. of Germany ....... 3624715

[51] Int. Cl.$^5$ ............................................... B60S 1/26
[52] U.S. Cl. ................... 15/250.21; 15/250.23
[58] Field of Search ........... 15/250.21, 250.23, 250.29, 15/250.3

[56] References Cited

U.S. PATENT DOCUMENTS

| 4,625,359 | 12/1986 | Egner-Walter et al. | 15/250.21 |
| 4,648,148 | 3/1987 | Egner-Walter et al. | 15/250.21 |
| 4,698,873 | 10/1987 | Aoki et al. | 15/250.23 X |

FOREIGN PATENT DOCUMENTS

| 3632190 | 12/1987 | Fed. Rep. of Germany . | |
| 2162054 | 1/1986 | United Kingdom | 15/250.21 |

Primary Examiner—Harvey C. Hornsby
Assistant Examiner—Joseph S. Machuga
Attorney, Agent, or Firm—Robert P. Seitter

[57] ABSTRACT

This invention describes a so-called reciprocating wiper system having a guide housing moving pendulum fashion and a wiper arm guided therein and radially retractable and extractable, wherein by various measures the volume of the guide housing is changed as compared to known embodiments and thus adapted to the space conditions in the engine compartment of a motor vehicle, wherein because of a change in the volume a lengthening of the wiper blade and thus an enlargement of the wiping area is made possible.

13 Claims, 3 Drawing Sheets

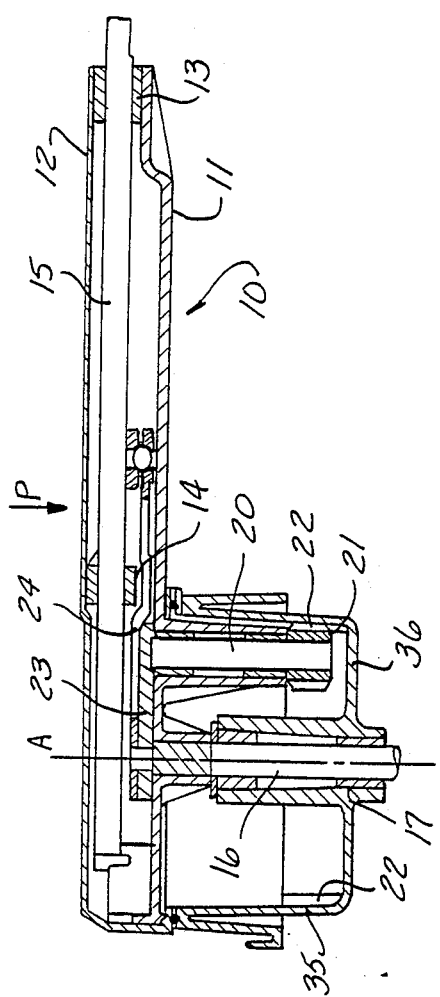
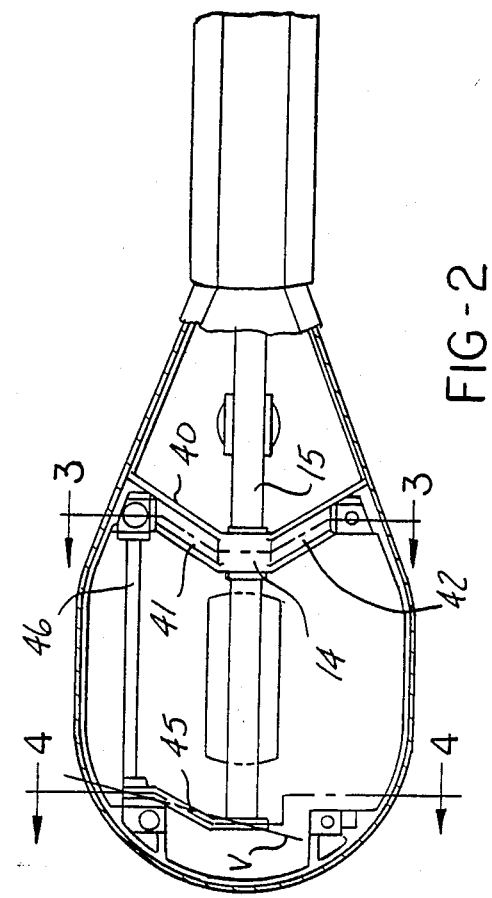
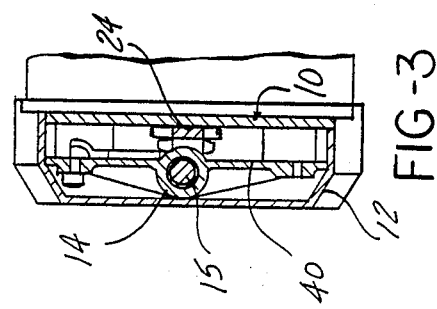
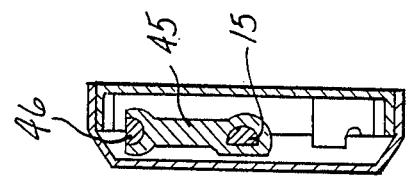
FIG-1
FIG-2
FIG-3
FIG-4

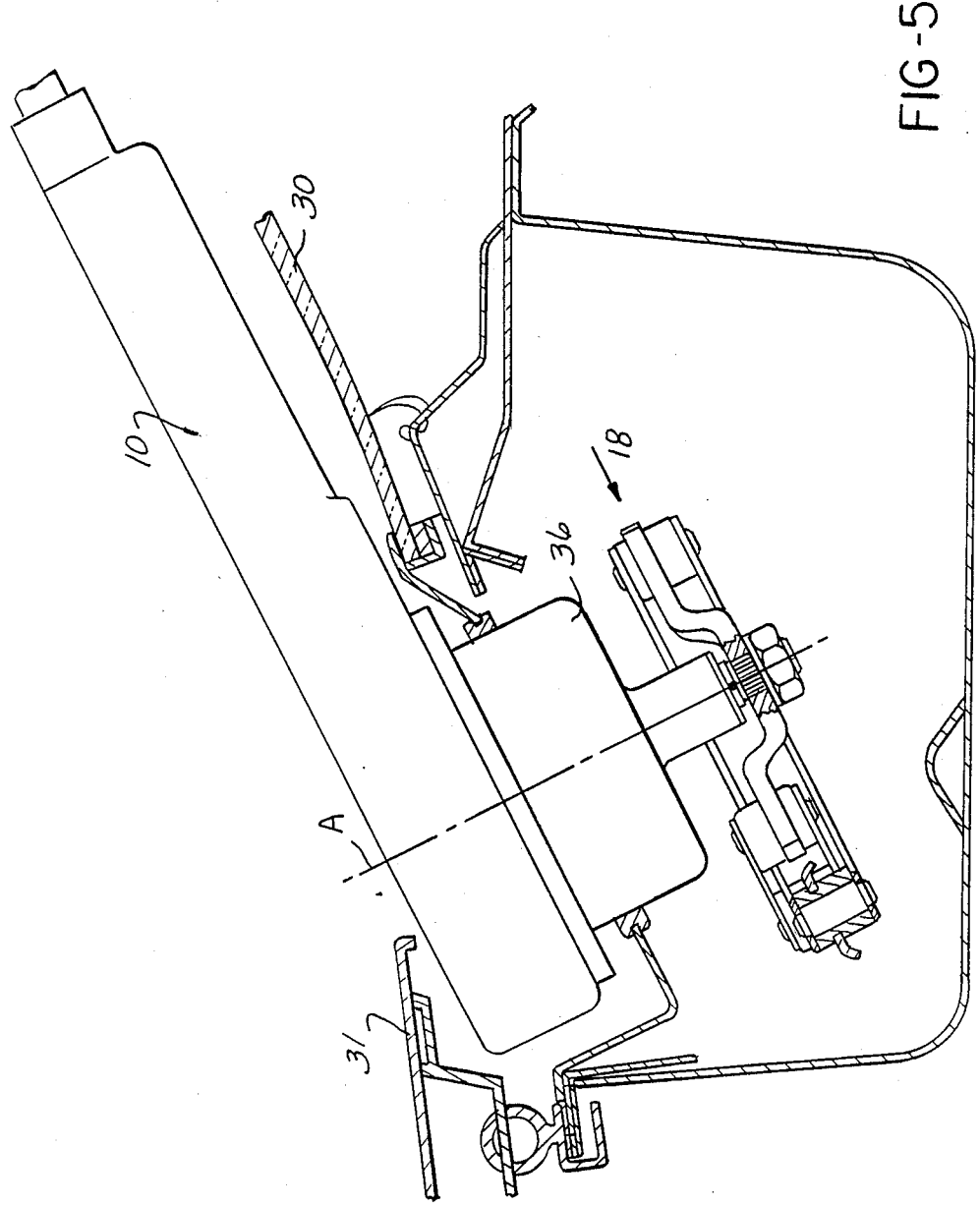

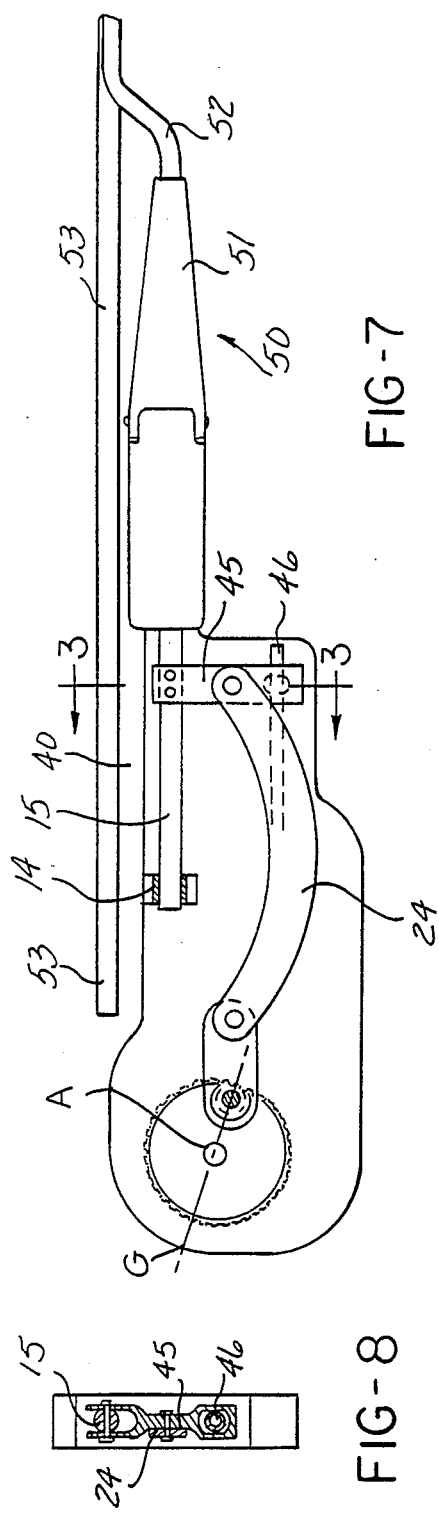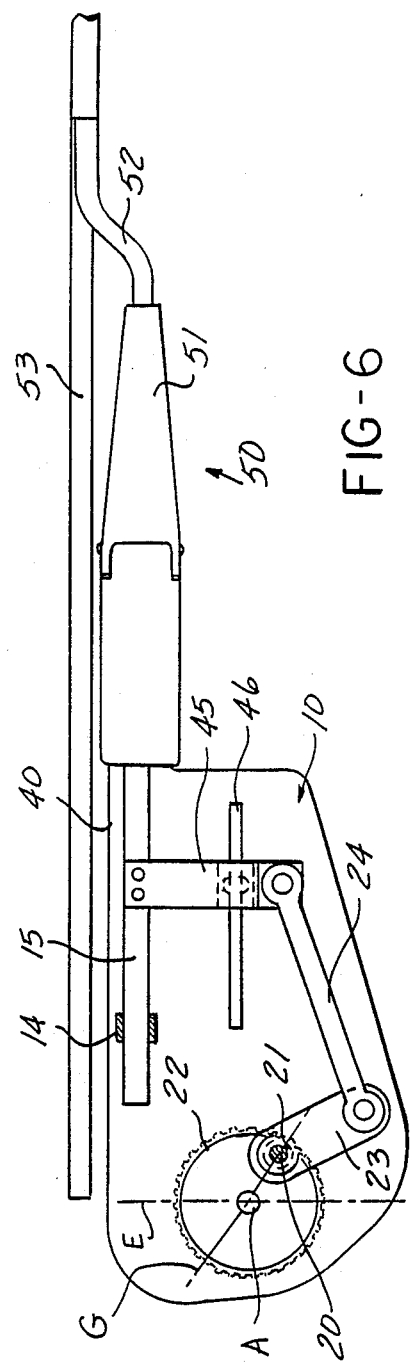

WINDSHIELD WIPER SYSTEM ESPECIALLY FOR MOTOR VEHICLES

This is a continuation of application Ser. No. 223,201, filed Apr. 20, 1988, now abandoned.

This invention relates to a windshield wiper system according to the features of the preamble of claim 1.

A windshield wiper system of this kind is known from the DE-OS No. 33 24 634. The wiper arm-and-blade assembly of a windshield wiper system of this kind is, if required, several times retracted and extracted in the radial direction during its swivelling motion, so that also the corner areas of the windshield are cleaned. The radial displacement of the wiper arm-and-blade assembly or of the piston connected with the form and displaceably mounted in a guide housing moving in pendulum fashion is in the known embodiment derived from the rotation of a shaft supported on the guide housing, which shaft carries a pinion outside the guide housing, which pinion meshes with a stationarily arranged toothed segment. The guide housing itself is driven via a shaft which is movable guided in a bearing bush of a supporting frame. Looking in the direction of displacement of the piston the drive shaft acts upon the guide housing approximately in the center of the latter. If a windshield wiper system is fitted in a motor vehicle in such a way that the drive shaft is arranged closely to the lower rim of the windshield, the front housing portion moves in front of the pane, whereas the rear housing portion moves in pendulum fashion in the engine compartment. It is thereby of advantage that only about half of the guide housing is positioned in front of the pane to be cleaned and, as a matter of fact, the view through the windshield is only impeded in exceptional cases. It is however a disadvantage that the other half of the housing dips relatively deep into the engine compartment, so that sufficient space has to be created there. However this space is not available in all vehicle models.

The guide housing of the known embodiment is constructed to be substantially symmetrical to the direction of displacement of the piston, which thus is displaceably guided in the center of the said guide housing and intersects the axis of rotation of the guide housing. The wiper arm-and-blade assembly is centrically fixed to the free end of the piston, with the wiper blade adjusted extactly in the longitudinal direction of the piston. The wiper blade ends at a spacing from the free end of the piston, so that between the axis of rotation of the guide housing and the adjacent end of the wiper blade there is left a relatively large area which is not wiped. This substantially symmetrical shape of the guide housing and the wiper arm-and-blade assembly can for some vehicles mean that the wiper blade projects relatively far into the windshield to be cleaned even in its parking position which fact is not accepted by some vehicle manufacturers predominantly on grounds of style.

On the whole it has to be stated that the known version cannot be used for all vehicle models.

Thus the object of the invention is to develop a windshield wiper system of this kind in such a way that it can also be used when there is only little space available for mounting purposes in the engine compartment. The wiping area is of course expected to meet the present standard or is even to be enlarged, if possible.

This problem is solved according to the invention with the characterizing features of claim 1.

The present invention is thereby based on the idea of being able to make the volume of the guide housing rear portion considerably smaller, when the shaft from which the direction of displacement of the piston is derived is arranged between the axis of rotation of the guide housing and the front end of the guide housing. Normally this measure makes the front portion of the housing larger, however its rear portion is so much diminished that it can be fitted in a motor vehicle even if there are narrow space conditions.

It is true that a wiper system has been known from the DE-AS No. 1 066 890 in which the windshield wiper is also radially retracted and extracted during the swivelling motion with the radial direction of displacement being derived from the rotation of a shaft which, looking in the longitudinal direction of the windshield wiper is arranged in front of a toothed segment. However the pinion fixed on this shaft does not mesh with a stationary toothed segment as in the subject matter of the present invention. Moreover this shaft or the pinion is co-axially arranged to the axis of rotation of the entire system, whereas in the present invention the shaft is arranged with a spacing from the axis of rotation in the space between this axis of rotation of the guide housing and the front and of the guide housing.

In contrast to the embodiment initially mentioned the drive shaft now acts upon the guide housing outside the center of the latter closely to the rear rim. Thus the front portion of the housing projects relatively far into the pane to be cleaned, so that the view conditions could be affected. In order to eliminate this disadvantage according to another feature of the invention the piston is guided laterally spaced from the axis of rotation of the guide housing. This proposal is based on the idea of being able to differ the known symmetric shape of the housing, when the piston is not centrally guided. The rim of the guide housing adjacent to the piston of a preferred embodiment extends with a small spacing from the piston and preferably linearly parallel to it. Thus in the parking position this rim of the guide housing adjacent to the piston does only project into the windshield area slightly farther than the windshield wiper, because compared with the known embodiment the spacing between the said housing rim and the windshield wiper looking in the direction of wiping can be reduced. In this connection it is thus pointed out that independent protection is claimed for this idea because it solves space problems independently of the embodiment according to claim 1 and improves the view conditions, because in comparison with the prior art the rim of the guide housing closely arranged to the windshield wiper projects only insignificantly into the area of the windshield in the parking position and in the reversing position of the wiper blade the guide housing projects only slightly into the engine compartment by means of this rim.

In reciprocating wiper system known until now—as has been mentioned—the wiper blade has been arranged on the longitudinal axis of symmetry of the piston. In an arrangement like this the wiper blade ends in front of the piston compulsorily, so that in the reciprocating wiper system according to the invention this would result in a relatively large unwiped area between the axis of rotation of the windshield wiper and this end of the wiper blade. In order to eliminate this disadvantage the wiper arm-and-blade assembly or the wiper blade respectively is not arranged symmetrically and the wiper arm of the wiper arm-and-blade assembly is in its end area bent in such a way that the wiper blade is arranged laterally beside the wiper arm. By this measure the wiper blade can be lengthened in comparison to known embodiments, so that it ends in an area laterally beside the guide housing. The wiper blade of a preferred embodiment is lengthened as far as to the vicinity of the axis of rotation. A solution of this kind is of advantage, if the drive shaft for the guide housing is inserted in an aperture of the windshield to be cleaned. Independent protection is claimed for this embodiment too, because this idea can of course bring about an improved view in conventional reciprocating wiper systems.

The invention and its advantageous embodiments are described below in detail by way of the embodiments shown in the drawing, in which FIG. 1 is a longitudinal section through the guide housing of a wiper system.

FIG. 2 is a view in the direction of arrow P,

FIG. 3 is a section taken on the line III—III,

FIG. 4 is a section taken on the line IV—IV,

FIG. 5 shows the mounting of a guide housing of this kind in a motor vehicle,

FIG. 6 is a skeleton view of another embodiment of a wiper system,

FIG. 7 shows a third embodiment and

FIG. 8 is a section taken on the line VIII—VIII.

In FIG. 1 a guide housing is designated 10, which includes a dimensionally stable base plate 11 and a plastics covering cap 12. To the base plate 11 two bearings 13 and 14 are fixed with a spacing from each other, in which bearings is guided a linearly displaceable piston 15. To the front end of this piston 15 can be fixed in a known manner the fastening member of a wiper arm. A drive shaft 16 is fixed in a manner protected against rotation on the base plate 11, which drive shaft is rotatably movable in bearings of a bearing bush 17. Upon the free end of the said drive shaft 16 acts in a known manner a cross steering mechanism which has not been shown in detail in FIG. 1. Thus the drive shaft 16 and the guide housing as well are driven in pendulum fashion about the axis of rotation 16.

The linear displacement of the piston 15 is derived via a crank mechanism from the rotation of a shaft 20 rotatably mounted on the guide housing 10, which shaft carries a pinion 21 outside the guide housing which pinion meshes with the stationarily arranged toothed segment 22. A crank 23 is torsionally firm fitted on this shaft 20. On the said crank is articulated a push rod 24, whose other end acts upon the piston 15 between the two bearings 13 and 14.

Especially from FIG. 1 can be seen that the said crank shaft 20 is arranged between the axis of rotation A of the guide housing 10 and the front end of the guide housing 10 carrying the bearing 13. On the other hand this results in a smaller rear portion of the guide housing in comparison with known embodiments and the drive shaft 16 now acts upon the guide housing closely to its rear end and not for example centrally on the guide housing. FIG. 5 indicates the mounting of a wiper system of this kind in a motor vehicle. The pane to be cleaned is designated 30 and the hood 31. It can be seen from the representation of FIG. 5 that to the left of the axis of rotation A only a relatively small mounting space is required. On the other hand it can also be seen from FIG. 5 that the front portion of the guide housing 10 projects relatively far into the area of the windshield 30 to be cleaned, which fact is of importance for the developments described below.

Due to an arrangement of shaft 20 and pinion 21 according to the invention it is now possible to form the stationary toothed segment 22 as a circular ring with internal teeth. Compared with known embodiments having only a semi-circular toothed segment this embodiment has the advantage of a greater stability and accuracy which fact has a favourable effect on the running properties and in particular on the noise behaviour. This toothed segment 22 is integrally worked into the generated surface 35 of a substantially cup-shaped supporting frame 36, onto which the bearing bush 17 is also integrally formed. This one-piece construction of bearing bush 17 and toothed segment 22 provides a quieter running in comparison with known systems in which the toothed segment is fixed onto the supporting frame as an independent part. In addition these measures are cost-saving.

In the interest of guiding the piston 15 free from play the two bearings 13 and 14 are secured in a dimensionally firm way to the same part, namely to the base plate 11. The rear bearing 14 which is positioned closely to the axis of rotation A of the guide housing 10 is thereby formed on a pillow block 40 having two shanks 41 and 42 running towards each other in the shape of a V. The ends of these shanks are screwed onto the base plate 11. The bearing 14 is located at the transition between the two shanks 41 and 42, thus approximately in the center of the pillow block 40. The pillow block 40 extends at least in this area with a spacing from the base plate 11, so that there is some space left for the push rod 24 through-projecting underneath the said bearing 14.

To the rear end of the piston 15 is fixed a radially protruding extension arm 45 in a torsionally firm way whose free end is guided in a guide rail 46 in order to protect the piston 15 against rotation. As in particular FIG. 2 shows this extension arm is bent in such a way that the conceived connecting line VI between the rear end of the piston 15 and the guide area on the guide rail 46 is adjusted approximately in parallel to the shank 41 of the pillow block 40. Looking in the direction of displacement of the piston 15 the guide area between extension arm 45 and guide rail 46 is thus positioned before the rear end of the piston which fact permitted to reduce the size of the guide housing rear portion. By the appropriately slantingly arranged shank of the pillow block 40 it is thereby achieved that the adjusting stroke of the piston and thus the extension arm 45 is not reduced. Just as the two bearings 13 and 14 the guide rail 46 is fixed onto the base plate of the guide housing 10 thus enabling an accurate adjustment of all these guide elements relative to one another.

FIG. 6 shows another embodiment of the invention with the shaft carrying the pinion 21 once again arranged between the axis of rotation A of the guide housing 10. In this embodiment it is important, that the piston 15 does not intersect the axis of rotation A of the guide housing 10, but is guided laterally to it with a spacing in a set-off way. The rim 40 of the guide housing 10 adjacent to the said piston 15 can then be linearly formed and be arranged with a small spacing from the said piston. This is possible, because so-to-speak the drive mechanism for the said piston 15 is not arranged symmetrically, but moved to one side of the piston. One can see from FIG. 6 that between the two bearings 13 and 14 an extension arm 45 projects radially from the piston 15, which extension arm itself is guided in a guide rail 46. In contrast to the embodiment according to FIGS. 1 to 5 the push rod now acts upon the extension arm 45 and not directly upon the piston 15. FIG. 6 thereby shows an embodiment in which the said extension arm 45 is guided on the guide rail between the point of articulation of the push rod 24 and the piston 15, whereas in the embodiment according to FIG. 7 the push rod 24 is centrally articulated between piston 15 and guide rail 46 on the said extension arm 45. In this embodiment according to FIG. 7 the push rod 24 is arc-shaped, that means, seen in general, it has a bulge between its two points of articulation, which bulge points away from the piston 15, in order to provide free motion tolerance for the said push rod 24 without the risk of colliding with the bearing 14.

From FIGS. 6 and 7 can furthermore be seen that the shaft 20 and the axis of rotation A of the guide housing 10 are positioned on a straight line G, which is adjusted at an angle to the direction of displacement of the piston 15. This measure also contributes to a satisfactory free motion for the push rod 24 and the guide housing can nevertheless be formed in a space-saving manner.

Thus on the whole it has to be stated that by moving the shaft 20 and/or the piston 15 and together with them the point of articulation of the push rod 24 in comparison with known embodiments a space-saving guide housing 10 is created which can be also used when there are narrow space conditions in particular motor vehicle models and the view through the windshield is nevertheless only slightly impeded.

In FIGS. 6 and 7 the wiper arm-and-blade assembly 50 of the windshield wiper system is also shown. Part of this wiper arm-and-blade assembly are a wiper arm 51 with a wiper rod 52 and a wiper blade 53. The front end portion of the wiper rod is bent in such a way that the wiper blade 53 is laterally arranged beside the wiper arm 51. This construction of the wiper arm-and-blade assembly 50 is known in itself has however until now not yet been used in so-called reciprocating wiper systems. Due to this construction of the wiper arm-and-blade assembly the wiper blade of a reciprocating wiper system can be longer than in known embodiments, so that it ends in an area laterally beside the guide housing 10. FIG. 7 shows an embodiment in which this wiper blade 53 ends approximately in the center between the axis of rotation A and the rear bearing 14. In the embodiment according to FIG. 6 the wiper blade ends closely to a plane E through the axis of rotation A of the guide housing 10 perpendicularly conceived to the direction of displacement of the piston 15. The wiper blade 53 of this embodiment according to FIG. 6 thus ends as closely adjacent to the axis of rotation A of the guide housing 10 as possible, by which measure the wiping area can be enlarged in comparison with known embodiments.

Whereas thus in the embodiment according to FIGS. 1 to 5 the guide housing—as it is known in itself—is formed so-to-speak symmetrically to the longitudinal axis of the piston, the guide housings according to FIGS. 6 and 7 are unsymmetrical in such a way that the wiper blade is guided closely to the piston 15 and in particular also extends closely to the axis of rotation A. This unsymmetrical construction of the guide housing 10 does not require a larger space. In some motor vehicle models a windshield wiper system of this kind can even be better accommodated.

We claim:

1. A windshield wiper system for a motor vehicle comprising:
   a guide housing having a front end;
   drive means for driving said guide housing in a pendulum fashion about an axis;
   a piston having two opposed ends, said piston being linearly displaceable in said guide housing along a longitudinal path which is laterally spaced from the axis of rotation of said guide housing;
   a wiper arm and blade assembly attached to said piston for movement therewith; and
   means for linearly displacing said piston in said housing along said longitudinal path, said means for linearly displacing said piston includes:
   a shaft having upper and lower ends rotatably mounted on said guide housing;
   a crank coupled to the upper end of said shaft;
   a push rod having two opposed ends, one of said ends of said push rod being coupled to said crank and said other end of said push rod being coupled to said piston;
   a pinion coupled to said lower end of said shaft, and
   a stationary toothed segment mounted outside of said guide housing and meshing with said pinion.

2. A windshield wiper system according to claim 1, wherein said guide housing includes a rim which extends along a path which is parallel to and laterally spaced from said piston.

3. A windshield wiper system according to claim 1, wherein said means for linearly displacing said piston further includes an extension arm coupling said other end of said push rod to said piston, said guide housing further including two spaced apart bearings and a guide rail for guiding said piston and said extension arm, respectively.

4. A windshield wiper system according to claim 3, wherein said other end of said push rod is pivotally mounted to said extension arm.

5. A windshield wiper system according to claim 4, wherein said push rod is mounted to said extension arm at a location which is between said piston and said guide rail.

6. A windshield wiper system according to claim 4, wherein said extension arm has a first and second end, with said first end being coupled to said push rod and wherein said guide rail for said extension arm is located between said first and second ends.

7. A windshield wiper system according to claim 4, wherein said push rod is pivotally mounted to said crank, and said push rod is shaped to form a bulge which points in a direction away from said piston.

8. A windshield wiper system according to claim 7, wherein said push rod is arc-shaped.

9. A windshield wiper system according to claim 1, wherein said shaft and said axis of rotation of the guide housing are positioned on a straight line which is at an angle to the direction of displacement of the piston.

10. A windshield wiper system according to claim 1, wherein said wiper arm and blade assembly include a wiper arm and wiper blade, wherein said wiper arm is bent in such a way that said wiper blade is arranged laterally beside said wiper arm.

11. A windshield wiper system according to claim 10, wherein said wiper blade ends in an area laterally beside said wiper arm.

12. A windshield wiper system according to claim 10, where said wiper blade ends closely to an imaginary plane which extends through said axis of rotation of the guide housing and is perpendicular to the direction of displacement of the piston.

13. A windshield wiper system according to claim 10, wherein said rim of the guide housing extends parallel to the wiper blade in the area adjacent to said wiper blade.

* * * * *